(12) United States Patent
Chen et al.

(10) Patent No.: US 7,830,634 B2
(45) Date of Patent: Nov. 9, 2010

(54) HEAD-DISK CONTACT DETECTION AND WORK FUNCTION DIFFERENCE DETERMINATION

(75) Inventors: Martin Yu-Wen Chen, Santa Clara County, CA (US); John Contreras, Palo Alto, CA (US); Luiz M. Franca-Neto, Santa Clara County, CA (US); Bernhard E. Knigge, Santa Clara County, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 12/343,244

(22) Filed: Dec. 23, 2008

(65) Prior Publication Data

US 2010/0157454 A1 Jun. 24, 2010

(51) Int. Cl.
*G11B 5/60* (2006.01)
*G11B 27/36* (2006.01)

(52) U.S. Cl. ......................................................... 360/75
(58) Field of Classification Search ........................ None
See application file for complete search history.

(56) References Cited

U.S. PATENT DOCUMENTS

| | | | | |
|---|---|---|---|---|
| 4,648,087 A * | 3/1987 | Scranton et al. | .......... | 360/234.7 |
| 4,931,887 A * | 6/1990 | Hegde et al. | .................. | 360/75 |
| 4,942,609 A * | 7/1990 | Meyer | .......................... | 360/31 |
| 5,136,250 A * | 8/1992 | Abdelli | ........................ | 324/661 |
| 6,674,590 B2 * | 1/2004 | Ottesen et al. | ................. | 360/75 |
| 6,728,050 B2 * | 4/2004 | Wilson | ......................... | 360/75 |
| 6,927,929 B2 * | 8/2005 | Gong et al. | .................... | 360/75 |
| 6,958,871 B2 * | 10/2005 | Hirano et al. | .................. | 360/31 |
| 7,038,875 B2 * | 5/2006 | Lou et al. | ..................... | 360/75 |
| 7,215,495 B1 * | 5/2007 | Che et al. | ...................... | 360/75 |
| 7,292,401 B2 * | 11/2007 | Shen et al. | ..................... | 360/69 |
| 7,312,941 B2 * | 12/2007 | Hirano et al. | .................. | 360/31 |
| 7,330,324 B2 * | 2/2008 | Morinaga et al. | .............. | 360/75 |
| 7,349,170 B1 * | 3/2008 | Rudman et al. | ................ | 360/75 |
| 7,405,896 B2 * | 7/2008 | Hirano et al. | .................. | 360/75 |
| 7,450,333 B2 * | 11/2008 | Hirano et al. | .................. | 360/75 |
| 7,450,335 B2 * | 11/2008 | Hirano et al. | ............. | 360/77.03 |
| 2007/0127147 A1 * | 6/2007 | Yokohata et al. | ............... | 360/75 |
| 2007/0127148 A1 * | 6/2007 | Yokohata et al. | ............... | 360/75 |
| 2008/0291564 A1 * | 11/2008 | Tang et al. | ..................... | 360/75 |

* cited by examiner

*Primary Examiner*—Hoa T Nguyen
*Assistant Examiner*—James L Habermehl

(57) ABSTRACT

In a method of head-disk contact detection in a hard disk drive, a Radio Frequency (RF) carrier signal is injected into a slider which is flying above a surface of a disk in a hard disk drive. A modulated version of the RF carrier signal is received from the slider. The modulated version of the RF carrier signal is demodulated to achieve a demodulated signal. A signal spectrum of a range of frequencies in the demodulated signal is monitored for activity indicative of a contact between a head of the slider and the surface of the disk. An occurrence of the contact is determined based upon an occurrence of the activity.

9 Claims, 13 Drawing Sheets

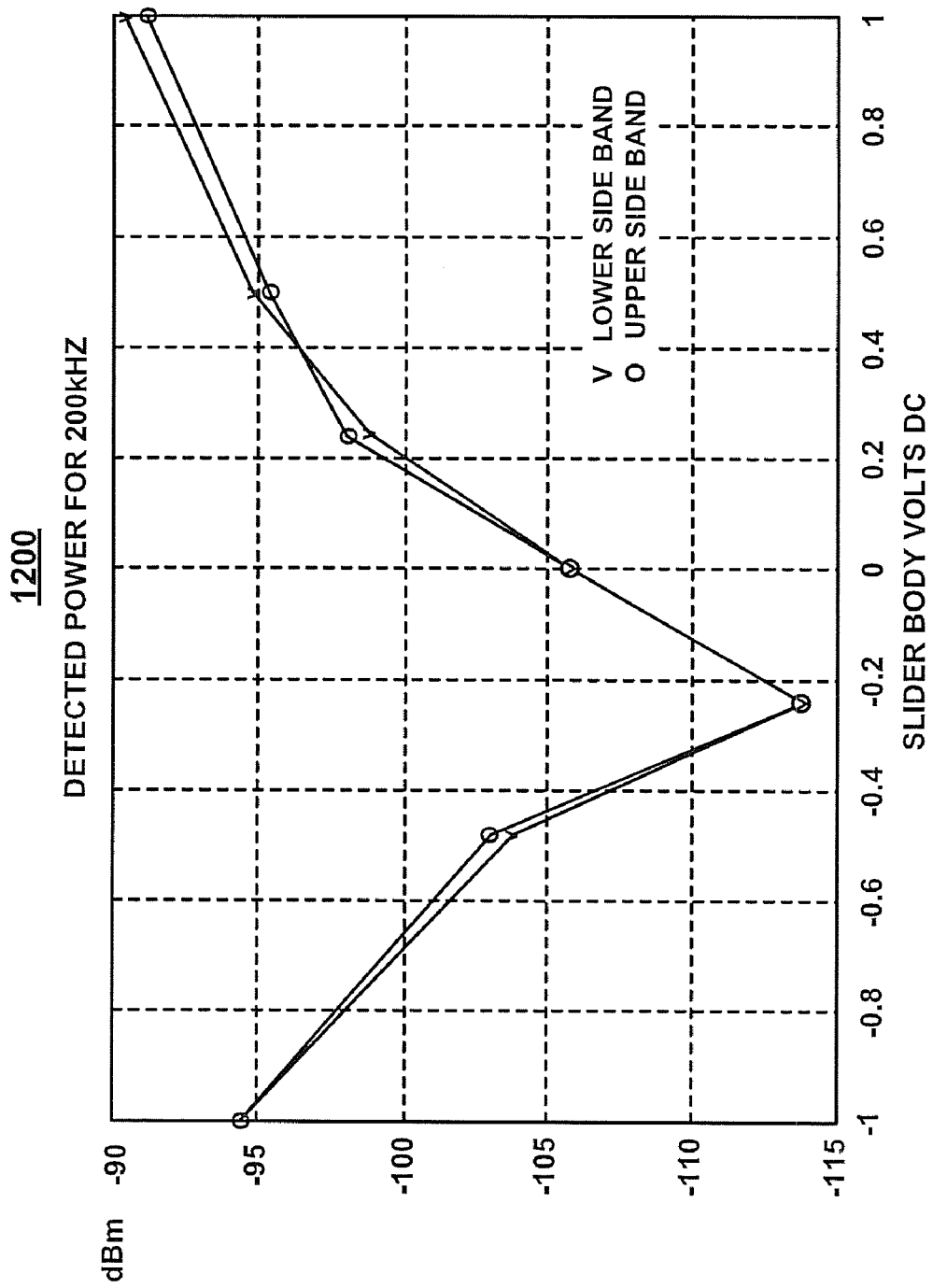

HEAD-DISK CONTACT DETECTION AND WORK FUNCTION DIFFERENCE DETERMINATION

BACKGROUND

Hard disk drives are used in almost all computer system operations. In fact, most computing systems are not operational without some type of hard disk drive to store the most basic computing information such as the boot operation, the operating system, the applications, and the like.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

Modern drives often have very narrow tolerances for components and operation of components. Disk drive sliders are designed to fly in very close proximity to the disk surface. For instance, in some systems the slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference (e.g., contact potential difference/difference in work functions) that exists between two different metals (different Fermi levels of slider and disk material); and impacts between the slider and disk surface.

BRIEF DESCRIPTION OF THE DRAWINGS

The accompanying drawings, which are incorporated in and form a part of this specification, illustrate some embodiments of the present invention and, together with the description of embodiments, serve to explain principles discussed below.

FIG. 12 shows an example of upper side band and lower side band detected power for a modulating signal as a function of Direct Current (DC) bias on a slider body, according to one embodiment.

Figure 1:
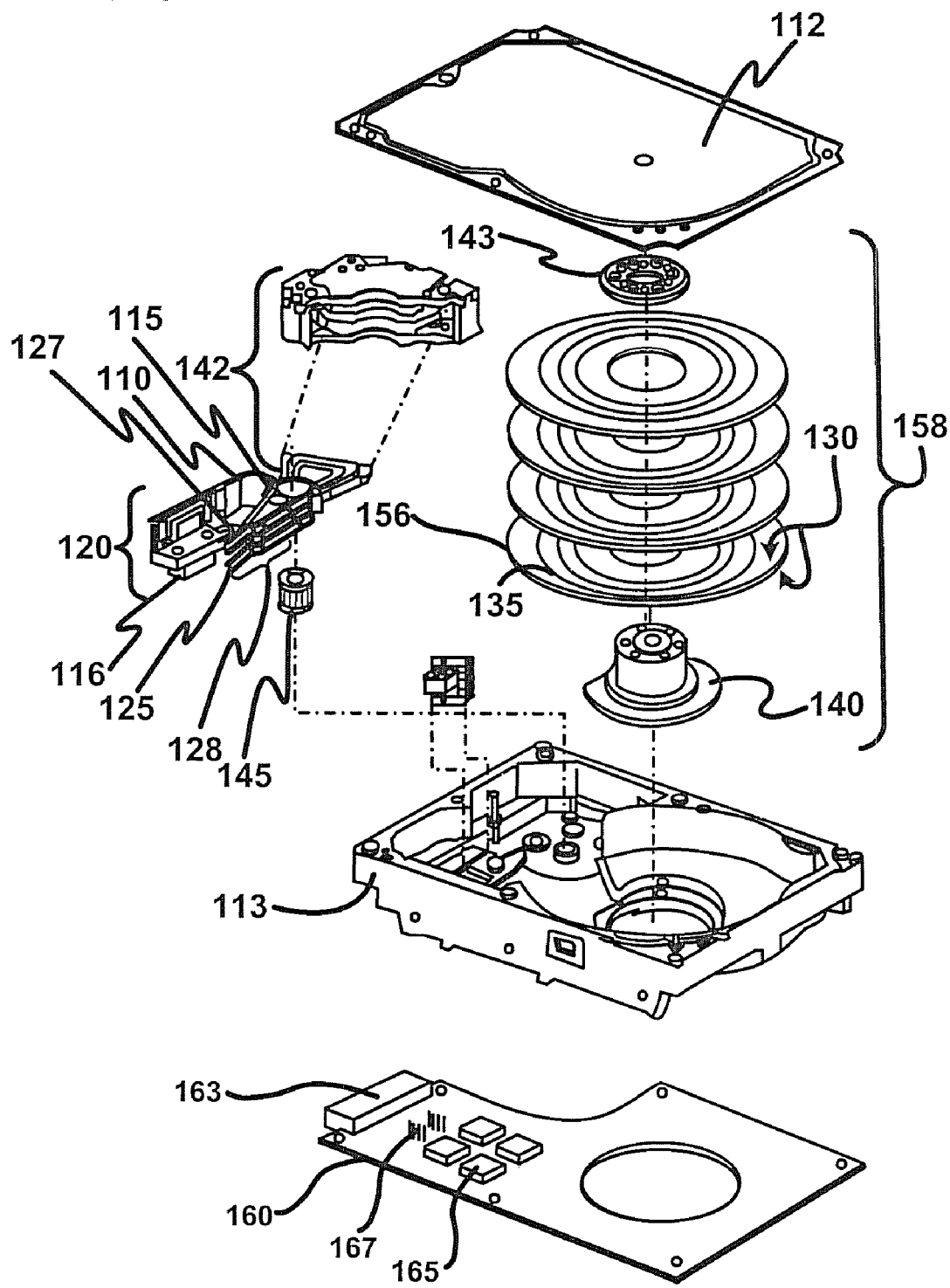
FIG. 1 is an isometric blow-apart of an HDD in accordance with one embodiment.

The drawings referred to in this brief description should be understood as not being drawn to scale unless specifically noted.

DESCRIPTION OF EMBODIMENTS

Reference will now be made in detail to several embodiments of the present invention, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the description of embodiments, discussions utilizing terms such as "injecting," "receiving," "demodulating," "analyzing," "monitoring," "combining," "detecting," "generating," "applying," "controlling," "modulating," "determining," "producing," "routing," "varying," or the like, refer to the actions and processes of a hard disk drive, Application Specific Integrated Circuit, hard drive controller, microcontroller, processor, or similar electronic computing device or combination of such devices. The hard disk drive (HDD), microcontroller, arm electronics (AE), front end electronics (FEE), or a similar electronic computing device controls, manipulates, and transforms data and signals represented as physical (electronic) quantities within the HDD's/AE's/FEE's/microcontroller's/electronic device's registers and memories and components, into other data and signals similarly represented as physical quantities within the HDD's/AE's/FEE's/microcontroller's/electronic device's memories or registers or other such information, voltage, and/or signal generation, storage, transmission, and/or manipulation components.

Overview of Discussion

Computers have become part of every day life, and as such, expectations and demands continually increase for greater speed for manipulating data, for holding larger amounts of data, while being more compact and consuming less energy.

To meet these demands for increased performance, the electromechanical assembly in a computer, specifically the Hard Disk Drive (HDD) has undergone many changes so that more data can be stored in smaller spaces and so that data can be stored and retrieved more quickly and efficiently. One aspect of these changes includes a reduction in the flying height of the head of a slider over the surface of a disk.

As flying heights diminish, it becomes more relevant to accurately control the head-disk distance and quickly detect contact between the head and the media of the surface of a disk, whenever it happens, to avoid damage to the head, media, or both. In general, the more expeditiously contact can be detected, the better. Detecting contact allows an action to be taken such as: not lowering a head further into the media; raising a head so that the contact is ceased; and/or re-reading data. Detecting contact is particularly important in the case of inadvertent contact during a read or write operation, as such contact can cause bouncing vibrations which contribute to errors in data which is read from or written to the media of the surface of a disk. A method and system are described herein which allow for "always on" detection of head-disk contact by an all electronic means which can be utilized within an HDD. By "always on," what is meant is that the detection of contact can occur during reading and writing operations or during a time when the head is idly flying above the surface of a disk. The head-disk contact detection method and system, as described herein, utilize radio frequency (RF) signal(s) to assist in the contact detection. In one embodiment, the utilized RF signal(s) operate in frequency band(s) which are not used by the read data, write data, and/or control signals of an HDD in which the method/system is employed.

Additionally, as the heads of a hard disk drive slider may fly only nanometers above a surface of a disk an attractive force between a slider and a disk surface is typically present due to a voltage differential caused by the difference in work function (also known as contact potential difference) between the slider and the disk. The work function differential disrupts or complicates the efforts to stabilize and/or control the flying height of the slider. A method and system for work function difference determination are described herein which allow the voltage, due to the difference in work function, to be determined in an all electronic procedure/circuit that can be utilized within an HDD. By determining the difference in work function, and associated voltage, an appropriate direct current bias voltage can be applied to neutralize it and its effects upon the slider. The work function difference determination method and system, as described herein, utilize RF signals to assist in determination of the direct current (DC) voltage due to the difference in work function (contact potential difference) between the slider and the disk. In one embodiment, these RF signals operate in frequency bands which are not used by the read data, write data, and/or control signals of an HDD in which the method/system is employed. As will be described below, the work function difference determination method and system share many features in common with the head-disk contact detection method and system even though their objectives are different.

The discussion will begin with a brief overview of a hard disk drive (HDD) which comprises a head-disk contact detection system, a work function difference determination system, or both. An example head-disk contact detection system will be described along with some example signal paths within a slider. Operation of the example head-disk contact detection system will then be described in more detail in conjunction with description of an example method of head-disk contact detection in a hard disk drive. Discussion will then proceed to the description of an example work function difference determination system. Operation of the example work function difference determination system will then be described in more detail in conjunction with description of an example method of determining a difference in work functions between a slider body and a disk in a hard disk drive.

Example Hard Disk Drive

With reference to FIG. 1, an isometric blow-apart of HDD 100 is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. Hard disk drive slider 125 includes one or more magnetic transducers or heads which read data from and write data to data tracks 135. Suspension 127 and hard disk drive slider 125 comprise head gimbal assembly (HGA) 128. Flex cable 110, which is part of HSA 120, conveys data between HSA connector 116 and arm electronics (AE) module 115. AE module 115 controls read and write operations, and as described herein, in various embodiments, includes head-disk contact detection system 200 (FIG. 2), work function difference determination system 900, or both. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other manners and located in other locations, in other embodiments.

The displayed configuration of HDD 100 is shown by way of example and not of limitation. It is appreciated that in some embodiments, one or more components of HDD 100 can be interchanged or shared between subassemblies while maintaining the spirit of the definitions of the aforementioned assemblies and subassemblies.

Example Head-Disk Contact Detection System

Figure 2:
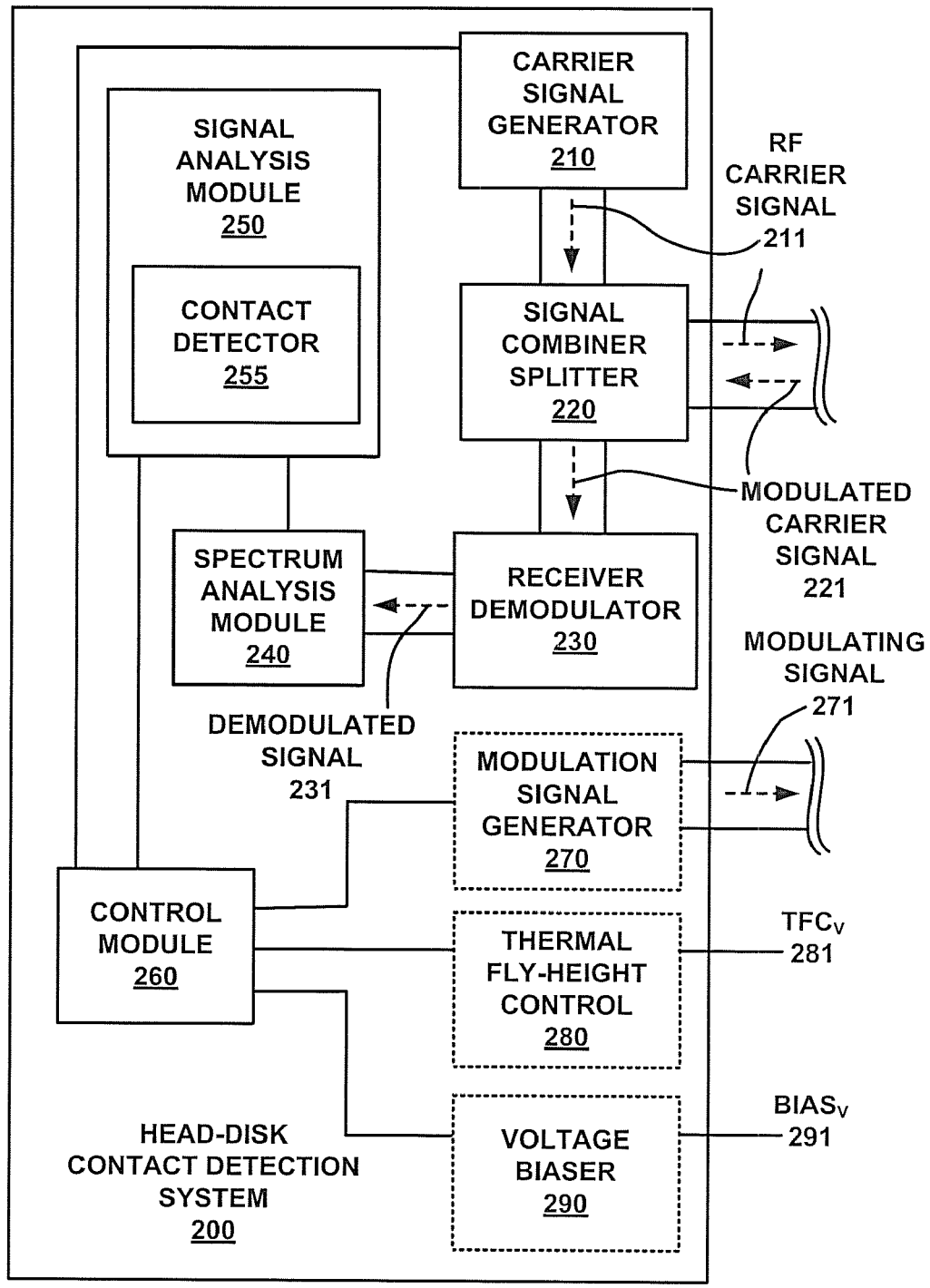
FIG. 2 is an example head-disk contact detection system, in accordance with one embodiment.

FIG. 2 is an example head-disk contact detection system 200 in accordance with one embodiment. Head-disk contact detection system 200 uses radio frequency (RF) signals injected into a slider, such as slider 125, to assist in detecting contact between a head of slider 125 and surface, such as surface 130, of a disk such as one of disks 156. The radio frequency based head-disk contact detection offered by system 200 is, in one embodiment always on, and thus operational during reading, writing, and idling operations involving slider 125. Alternatively, system 200 can be selectively utilized for detecting contacts during one or more of reading, writing, or idling. In various embodiments, head-disk contact detection system 200 is implemented as a portion of AE module 115 or front end electronics. This can comprise implementation within an integrated circuit, such as, for example, an Application Specific Integrated Circuit. In some embodiments, system 200 is included in a hard disk drive such as HDD 100. Depending on the method of signal injection and the frequencies selected, it is appreciated that this system can be operated in an "always on" fashion without interfering with HDD operations, and as such, can detect head to media contact whenever it happens (whether during writing or reading or idling).

As depicted in FIG. 2, in one embodiment, head-disk contact detection system 200 comprises a carrier signal generator 210, a signal combiner splitter 220, a receiver demodulator 230, a spectrum analysis module 240, a signal analysis module 250, a contact detector 255, and a control module 260. In one embodiment, contact detector 255 is included as a portion of signal analysis module 250. In some embodiments, head-disk contact detection system 200 also comprises one or more of modulation signal generator 270, Thermal Fly-height Control (TFC) 280, and voltage biaser 290.

Carrier signal generator 210, in one embodiment, generates an RF carrier signal 211. In one embodiment RF carrier signal is out-of-band above a frequency band of read data and control signals in a hard disk drive, such as HDD 100, in which system 200 is utilized. Consider an embodiment where the read data and control signals of HDD 100 are in the range of approximately 100 MHz to 3.5 GHz. In such an embodiment, carrier signal generator 210 generates RF carrier signal 211 at a frequency above 3.5 GHz, such as at approximately 4 GHz. Such an RF carrier signal does not interfere with the read data and control signals of HDD 100. Moreover, modulation of RF carrier signal 211 is taken into account. For example if RF carrier signal 211 is to be modulated such that a side band is generated a 200 KHz below RF carrier signal 211, then RF carrier signal 211 is generated at a frequency high enough above the frequency band of read data and control signals that such a lower side band does not fall into the frequency band of the data and control signals. It is appreciated that this system can be "always on," without interfering with HDD operations, and as such, can detect head to media contact whenever it happens (whether during writing or reading or idling).

Signal combiner splitter 220 is coupled with carrier signal generator 210 and injects RF carrier signal 211 into a slider, such as slider 125 of hard disk drive 100. Signal combiner splitter 220 also splits out and routes a modulated version of RF carrier signal 211 (modulated carrier 221) that is received from the same slider. Modulated carrier 221 is routed to receiver demodulator 230. Alternatively, in one embodiment, receiver demodulator 230 receives modulated carrier 221 directly from the slider.

Receiver demodulator 230 receives modulated carrier 221 from a slider and demodulates the modulated signal(s), within a particular frequency band, which are modulated onto modulated carrier 221, to achieve/produce demodulated signal 231. Consider an embodiment where modulated carrier 221 is modulated with frequencies of interest which are located in a frequency range which is 100 kHz-300 kHz above and below RF carrier signal 211. In one such embodiment, demodulated signal 231 comprises demodulation of signals in all or some portion of the range of approximately 300 kHz below and 300 kHz above RF carrier signal 211. It is appreciated that modulated carrier 221 can be modulated in the range of such frequencies of interest by natural vibrations of slider 125 during flying operations (e.g., at ~180 kHz), by electrostatic vibrations induced by modulating signal 271 (e.g., at ~200 kHz), and (in a somewhat random fashion) by vibrations induced into slider 125 due to head-disk contact (e.g., in a range between ~200 kHz and ~300 kHz).

Spectrum analysis module 240 produces a signal spectrum of all or some portion of the range of frequencies in the demodulated signal. Spectrum analysis of the range of frequencies produces a signal spectrum comprising amplitude(s) associated with one or more constituent frequencies in the analyzed range of frequencies. In one embodiment, spectrum analysis module 240 utilizes a Fast Fourier transform (FFT) to accomplish the spectrum analysis and production of the signal spectrum in the form of a power spectrum of a plurality of frequencies. In other embodiments, other time domain or frequency domain techniques signal analysis techniques, such as band pass filtering, can be used to develop the signal spectrum. In one embodiment, spectrum analysis module 240 produces a signal spectrum of a tone induced by the modulating signal (the modulating signal is an alternating current signal which induces physical modulation of the slider and thus modulates the flying height of the slider, which, in turn, results in modulation of an RF carrier signal). In one embodiment, this tone is at or near 200 kHz. In one embodiment, this tone exists as upper and lower side bands modulated onto the RF carrier signal. In one embodiment, spectrum analysis module 240 analyzes a signal spectrum of a tone induced by a natural modulation of the slider and the resulting modulation of the fly height of the slider.

Signal analysis module 250 analyzes the signal spectrum of the range of frequencies in the demodulated signal for activity indicative of a contact between a head of the slider and a surface of a disk of the hard disk drive. This can comprise monitoring the signal spectrum for a diminished amplitude of a particular frequency (such as the approximately 200 kHz tone), where such a diminishment is indicative of occurrence of contact. This can additionally or alternatively comprise monitoring the signal spectrum for an augmented amplitude and/or increased richness in energy in a particular frequency range (e.g., between 200 kHz and 300 kHz) or which is also indicative of the occurrence of contact between a head of a slider and a surface of a disk. The increased richness can be evidenced by or demonstrated as an appearance of broadband signal activity in the particular frequency range.

Contact detector 255, in one embodiment, detects an occurrence of head-disk contact based upon an occurrence of one or more of the activities that are monitored for by signal analysis module 250.

Control module 260, in various embodiments, controls when and whether system 200 is used for head-disk contact detection, including: control over the generation of RF carrier signal 211 by carrier signal generator 210; control over when and whether a modulating signal is generated by modulation signal generator 270; control of the frequency of modulating signal 271 (e.g., 100 kHz, 200 kHz, some other frequency, or no frequency); control over whether and what Thermal Fly-height Control (TFC) voltage 281 is generated and applied to a TFC heater coil; and control over whether and what Direct Current (DC) bias voltage 291 is generated and applied to a slider body by voltage biaser 290. In one embodiment, control module 260 controls application of and stepping tip and down of a DC bias voltage 291 which is generated and applied to a slider by voltage biaser 290.

In one embodiment, control module 260 initiates one or more actions based upon contact detector 255 determining occurrence of head-disk contact. An example of such an action is reducing or ceasing the application of TFC voltage 281 such that slider 125 is moved away from contact with a surface 130 of a disk 156. Another example of such an action is altering a DC bias voltage being applied to slider a 125 or a disk 156, such that there is less or no actively induced electrostatic attraction between slider 125 and disk surface 130 of disk 156.

In one embodiment, when included, modulation signal generator 270 generates an modulating signal 271. In one embodiment, modulating signal 271 is out-of-band below the frequency band of read data and control signals in a hard disk drive. In some embodiments, modulating signal is also outside of the frequency band of write data signals. Due to being out-of-band, this modulating signal does not interfere with read/write/control operations of a slider when it is induced into the body of a slider, such as slider 125. Modulation signal generator 270, in one embodiment, operates under the control of control module 260 to generate a modulating signal 271 for injection into slider 125. Modulating signal 271 is an AC (alternating current signal). Modulating signal 271 causes an electrostatic modulation of slider 125 at a fundamental frequency (such as approximately the pitch 2 mode vibration frequency) of slider 125. In one embodiment, a modulating signal 271 of approximately 100 kHz causes an electrostatic modulation of slider 125 at harmonic approximately 200 kHz. This 200 kHz is a harmonic of the 100 kHz modulating frequency and is at or near a fundamental frequency associated with slider 125. In one embodiment, a different modulating signal 271 can be generated. For example, an modulating signal 271 of approximately 200 kHz also causes an electrostatic modulation of slider 125 at approximately 200 kHz if the work function difference between slider and disk is not neutralized (as is explained below). The modulation of slider 125 in this manner causes the fly height of slider 125 to modulate up and down relative to the surface of a disk, such as disk 156.

TFC 280 operates under the control of control module 260 to generate a TFC voltage 281 for application to a heater coil of slider 125. In general, by increasing and decreasing TFC voltage 281 slider a portion of 125 is caused to expand and contract (back to its unexcited size) thus stepping slider 125 closer to or further away from surface 130.

Voltage biaser 290 operates under the control of control module 260 to generate one or more DC voltages for application to slider 125. In one embodiment, as will be described herein, control module 260 can control generation of a varying voltage 291 to assist in work function difference determination. By a varying DC voltage what is meant is that a fixed DC voltage is applied and is varied up and/or down to other fixed DC voltages 291, such as, for example, in steps or in a ramping fashion. As an example, if an initial voltage of +0.5V DC is applied, this might be varied by +/−0.05V steps up to +1.5V and down to −1.5V under direction from control module 260. For example, a particular voltage 291 (which may be alternating current, direct current, or both) can be applied to neutralize a difference in work functions between slider 125 and disk surface 130. In one embodiment, after neutralization, an additional DC voltage 291 can be applied to create an electrostatic attraction between slider 125 and disk surface 130. This additional well controlled voltage 291 can be used for active fly-height control and/or active damping of slider vibrations.

Example Signal Paths Through a Slider

Figure 3:
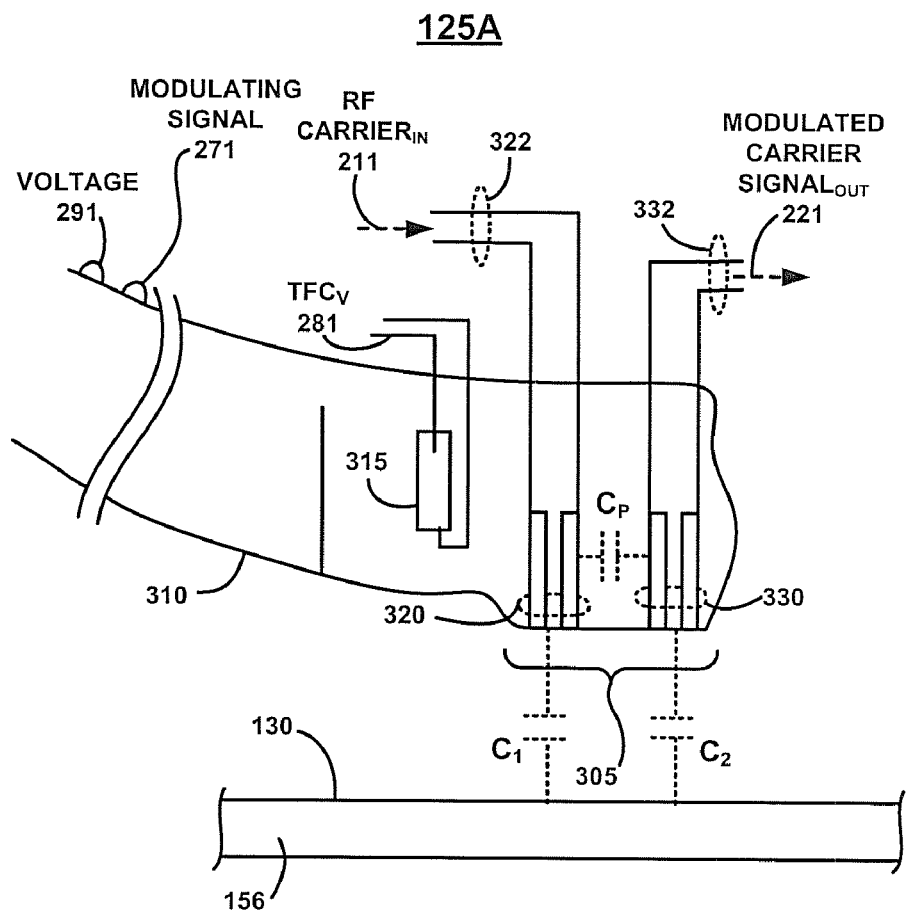
FIG. 3 shows an example of signal paths through a slider, according to one embodiment.

FIG. 3 shows an example of signal paths through a slider 125A, according to one embodiment. In one embodiment, slider 125A is the same as or similar to slider 125, of FIG. 1. A head region 305 (often generically referred to as the "head" of slider 125) includes read and write heads which are used to read data from and write data to disk 156. In operation head region 305 is typically placed in close proximity to disk surface 130 during read and write operations. Moreover, head region 305 is typically located on a portion of a slider (e.g., the trailing edge) which is designed to be in the closest proximity to disk surface 130 during flying operation of slider 125A above disk surface 120. Head-disk contact as described herein, generally refers to contact between head region 305 and disk surface 130. Contact between head region 305 and disk surface 130 causes vibrations and bouncing of slider 125A which may disrupt read or write activities. Contact between head region 305 and disk surface 130 may also cause damage to disk surface 130 and/or to slider 125A. Thus, system 200 is used to detect head-disk contact between head region 305 and disk surface 130.

With continued reference to FIG. 3, RF carrier signal 211 is shown being injected in differential mode into the existing reader lines 322 which are coupled to reader element (read head) 320. In differential injection, a signal is injected over a set of lines causing equal oscillations of voltage offset in each line of the set of lines used for injection or reception. For example, RF carrier signal 211 is injected, in one embodiment, into reader lines 322 via an interconnect which exists at the arm electronics end of slider 125A. RF carrier signal 211 is capacitively coupled from reader element 320 to writer coil (write head) 330 via capacitor $C_P$ which is an effective capacitance that exists between reader element 320 and writer coil 330. RF carrier signal 211 is also capacitively coupled from reader element 320 to writer coil (write head) 330 via a path from reader element 320 through effective capacitor $C_1$ to surface 130 and back through effective capacitor $C_2$ to writer coil 330. It is appreciated that capacitors $C_P$, $C_1$, and $C_2$ are not actual capacitors, but rather models of effective capacitances which exist between "plates" of read element 320, writer coil 330, and disk surface 130. These "plates" are separated by small distances either within slider 125A, or between portions of slider 125A and disk surface 130.

RF carrier signal 211 is modulated as it travels through slider 125A due to slider 125A being vibrated/modulated by natural and/or induced modulation of height of slider 125A. The modulated carrier 221 is conveyed out of slider 125A via existing writer lines 332 which are coupled to writer coil 330. In one embodiment, the modulation of RF carrier signal 211 to produce modulated carrier 221 occurs due to the natural vibrations of slider 125A as it flies above surface 130. In one embodiment, such natural vibrations are associated with pitch 2 mode vibrations of slider 125A. For example, in one embodiment such pitch 2 mode vibrations occur at approximately 180 kHz in slider 125A and cause a modulation approximately 180 kHz above and below the frequency of RF carrier signal 211. In one embodiment, the modulation of RF carrier signal 211 to produce modulated carrier 221 occurs due to electrostatic vibrations of slider 125A which are caused by modulating signal 271. In one embodiment, modulating signal 271 causes the slider to vibrate at approximately 200 kHz, thus modulating a signal approximately 200 kHz above and below the frequency of RF carrier signal 211. In one embodiment, modulating signal 271 is injected into slider body 310. In other embodiments, modulating signal 271 is injected on one or more existing signal lines (e.g., reader lines, writer lines, TFC lines, or the like) and/or special purpose signal lines which couple slider 125A with modulation signal generator 270. In one embodiment, modulating signal 271 is injected on the same signal lines as RF carrier signal 211. In embodiments where modulating signal 271 is injected, such as into body 310 or on lines other than to the head, electrical connections from the head elements to the slider body are provided in the slider and head design. It is appreciated the modulation of slider 125, causes a modulation in the fly height of slider 125.

It is appreciated that other existing or special purpose signal lines besides reader lines 322 and writer lines 332 can be used, in some embodiments, to inject RF carrier signal 211 into slider 125A and/or to convey modulated carrier 221 out of slider 125A. It is also appreciated that the path illustrated in FIG. 3 can be reversed, and that RF carrier signal 211 can be injected in differential mode on writer lines 332 while modulated carrier 221 is conveyed out of slider 125 via reader lines 322. Moreover, in one embodiment, RF carrier signal 211 can be injected on one set of signal lines and modulated carrier and modulated carrier can be conveyed out of slider 125A on the same set of lines. In one embodiment, RF carrier signal 211 is injected alternatively on reader lines 322 when writing and on writer lines 332 when reading. In one such embodiment, modulated carrier 221 is received from reader lines 322 when reading and from writer lines 322 when writing. As a stronger signal is injected and a weaker signal is returned, alternating injection in such a fashion further reduces the chance of interference with the operation of a hard disk drive such as HDD 100, and in particular reduces the chance of interface with the relatively weak read data signals.

As illustrated in FIG. 3, in one embodiment, TFC voltage 281 is coupled to heater coil 315. In one embodiment, voltage 291 is coupled to slider body 310. In one embodiment, slider body 310 is isolated from ground. It is appreciated that TFC voltage 281 and voltage 291 can be coupled to slider 125A in this fashion even when other signal injection techniques, signal paths and/or signal lines are utilized to couple RF carrier signal 211 to slider 125A and to convey modulated carrier 221 out of slider 125A.

Example of Common Mode Signal Injection into a Slider

Figure 4A:
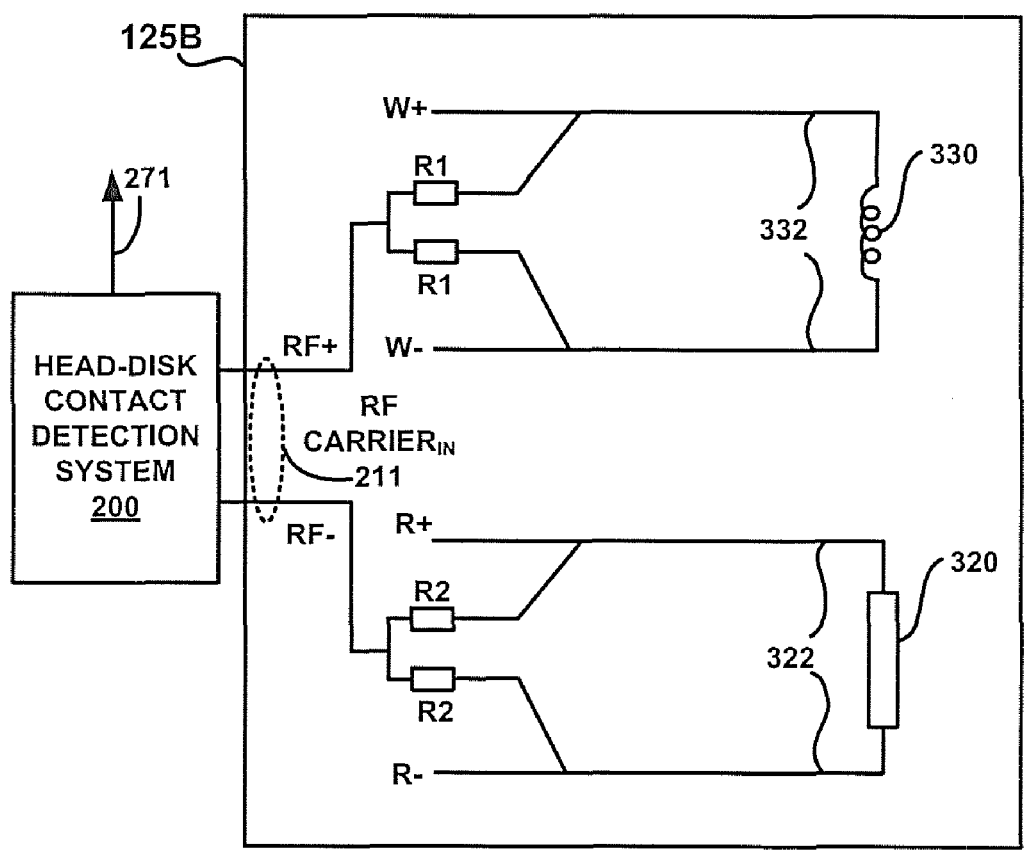
FIGS. 4A and 4B show some examples of common mode signal injection into a slider, according to various embodiments.
Figure 4B:
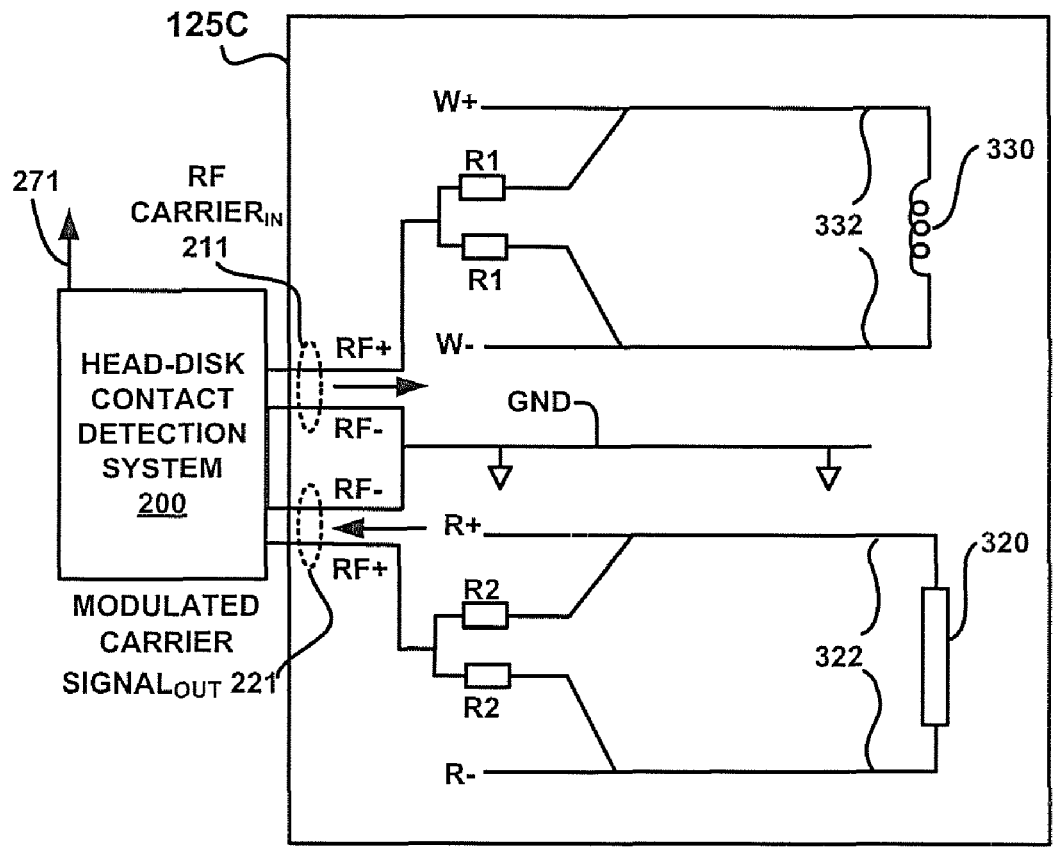

FIG. 4 shows an example of common mode signal injection into a slider, according to one embodiment. In one embodiment, slider 125B is the same as or similar to slider 125, of FIG. 1, and slider 125A of FIG. 3. FIG. 4 shows RF carrier signal 211 being injected in common mode into the existing reader lines 322 which are coupled to reader element (read head) 320 and into existing writer lines 332 which are couple to writer coil 330. In common mode, half of the RF carrier signal 211 is injected on one set of lines to slider 125B (e.g. RF+ on writer lines 332) while the other half is injected on another set of lines to slider 125B (e.g., RF− on reader lines 322). As shown, in one embodiment, resistors R1 and R2 allow for injection of RF signal without disturbance of the write and read signals. As illustrated, in one embodiment, a pair of lines used for injecting RF+ is also used for conveying write signals W+ and W− and a pair of lines used for injecting RF− is also used for conveying R+ and R−. In FIG. 4b, the availability of a common ground enables the creation of a two-port signaling scheme to inject and receive signals in common-mode. It is appreciated that other sets of existing or special purpose signal lines on slider 125B can be utilized, in some embodiments, for common mode injection of RF carrier signal 211.

Common mode injection prevents a voltage differential from existing between either of the reader lines 322, due to the injection of RF carrier signal 211. Common mode injection also prevents a voltage differential from existing between either of the two writer lines 332, due to the injection of RF carrier signal 211. Even though RF carrier signal 211 may be out-of-band of the read data and control signals, and thus should cause no interference, common mode injection further reduces the possibility of interference with HDD operation. Additionally, interference is also minimized, in both common mode and differential mode injection, due to RF carrier signal 211 being of very low amplitude compared to read data signals, write signals, and control signals used in an operation HDD. Common mode signaling allow for very low voltage levels in the reader in case of unbalance or non-idealities, which helps in protecting the reader sensor.

Modulating signal 271 can also be injected in common mode in a similar fashion, differential mode, or can be injected into a body of slider 125B in the manner illustrated in FIG. 3. As with other injection methods, injection of modulating signal 271 causes a modulation of slider 125 and results in a modulation of the fly height of slider 125. As with other methods of slider modulation described herein, the modulation of the fly height caused by modulating signal 271 modulates capacitances between slider 125 and a disk, thus modulating an injected carrier signal 211 into modulated carrier 221. Additionally, it is appreciated that, modulated carrier 221 can be conveyed out of slider 125B in common mode or in differential mode.

Example Method of Head-Disk Contact Detection

Figure 5:
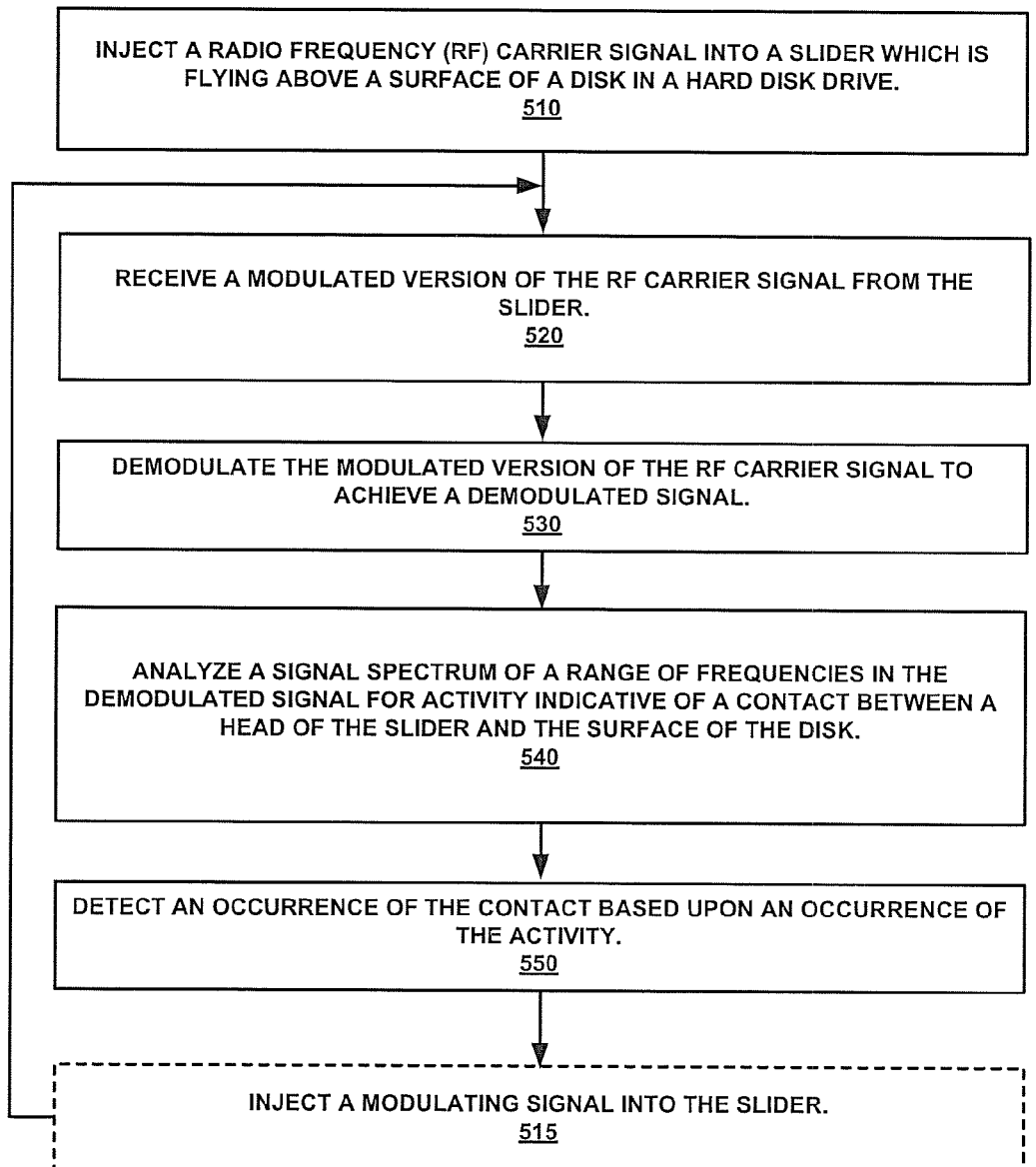
FIG. 5 shows a flow diagram of an example method of head-disk contact detection in a hard disk drive, according to one embodiment.

FIG. 5 shows a flow diagram 500 of an example method of head-disk contact detection in a hard disk drive, according to one embodiment. In one embodiment, this method is used in an always on fashion to detect head-disk contact during reading, writing, or idling operations of a hard disk drive such as HDD 100. Reference will be made to FIGS. 1, 2, 3, and 4 and the diagrams of FIGS. 6, 7, and 8 in the description of the method of flow diagram 500.

At 510 of flow diagram 500, in one embodiment, the method injects an out-of-band Radio Frequency (RF) carrier signal into a slider which is flying above a surface of a disk in a hard disk drive. The injected RF carrier signal is out-of-band above a frequency band of read data and control signals in the hard disk drive in which the method is being employed. In one embodiment, this comprises carrier signal generator 210 generating RF carrier signal 211 and signal combiner splitter 220 injecting RF carrier signal 211 into slider 125. As described above in conjunction with FIG. 3 and FIG. 4, this can comprise differential mode injection or common mode injection.

Figure 6:
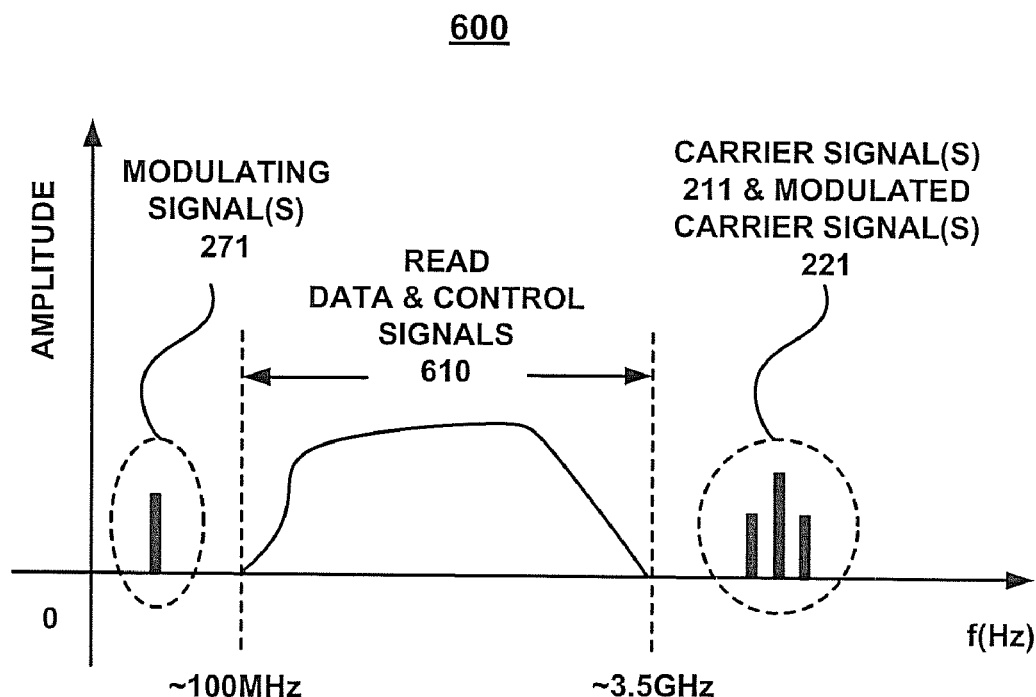
FIG. 6 shows an example of spectrum allocation for out-of-of band signals, according to one embodiment.

FIG. 6 shows an example of spectrum allocation for out-of-of band signals used according to one embodiment. In FIG. 6, read data and control signals 610 are in the range of ~100 MHz to ~3.5 GHz in a particular HDD, such as HDD 100. As shown, RF carrier signal 211 is at a frequency above the range of signals 610. Additionally, modulated carrier 221 is also above the range of signals 610 while modulating signal 271 is below the range of signals 610. Following the example illustrated by FIG. 6, in one embodiment, RF carrier signal 211 is at a frequency such as 4 GHz, which is well above the top end of signal range 610.

At 515 of flow diagram 500, in one embodiment, the method injects an out-of-band modulating signal into the slider. The injected modulating signal is out-of-band below the frequency band of read data, write data, and/or control signals in the hard disk drive in which the method is being employed. In one embodiment, this comprises modulation signal generator 270 generating and then injecting modulating signal 271 into slider 125. In one embodiment, modulating signal 271 is injected via a coupling to slider body 310, as illustrated in FIG. 3, modulating signal 271 can also be injected in a common mode or differential mode fashion similar to the illustrations of the injection of RF carrier signal 211 which are shown and described in conjunction with FIG. 3 and FIG. 4. It is appreciated that, in some embodiments, procedure 515 can be omitted.

Referring again to the example illustrated by FIG. 6, in one embodiment, modulating signal 271 is at a frequency such as 100 kHz or 200 kHz, which is well below the bottom end of signal range 610. Modulating signal 271 causes electrostatic vibrations within a slider such as slider 125.

At 520 of flow diagram 500, in one embodiment, the method receives a modulated version of the RF carrier signal from the slider. For example, in one embodiment, this comprises head-disk contact detection system 200 receiving modulated carrier 221 from a slider, such as slider 125. This can comprise signal combiner splitter 220 or some other portion of head-disk contact detection system 200 receiving modulated carrier 221. Modulated carrier 221 comprises a modulated version of injected RF carrier signal 211 which has been modulated by: the injected modulating signal 271; by natural oscillations the slider; and/or by oscillations of the slider caused by head-disk contact between the slider and the surface of a disk. Both natural and induced oscillations produce modulation of the value of capacitance (e.g., C1 and/or C2) between slider and disk, which by its turn produces modulation of the RF carrier by the modulating signal.

Figure 7:
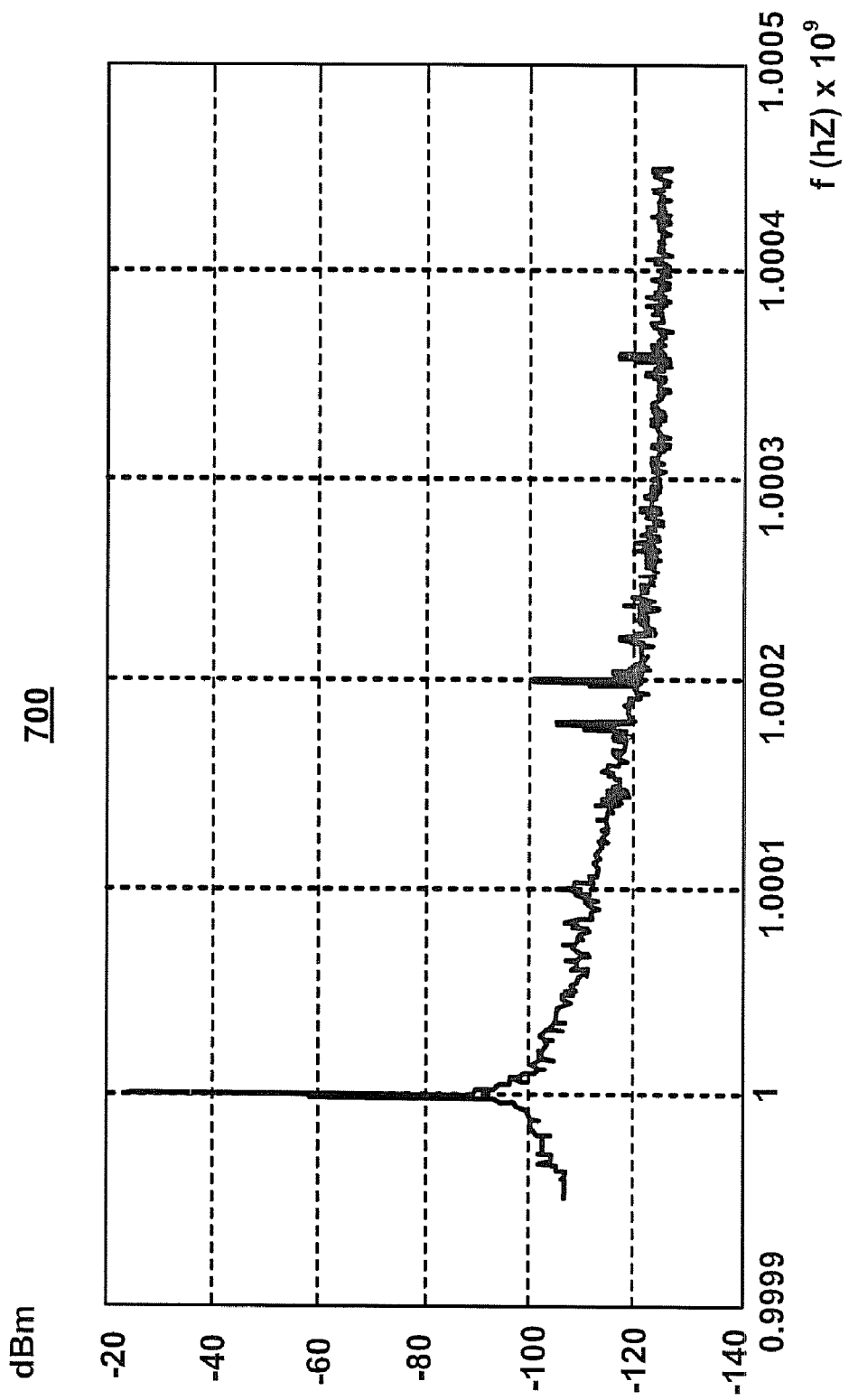
FIG. 7 shows an example of spectrum modulation of signals on writer lines prior to head-disk contact, according to one embodiment.

FIG. 7 shows an example 700 of spectrum modulation of signals on writer lines prior to head-disk contact, according to one embodiment. Example 700 illustrates an RF carrier (e.g., the carrier portion of modulated carrier 221) represented by a spike 1 GHz. The 1 GHz RF carrier is well above the operating frequency range of read data and control signals in the particular hard drive in which the carrier signal was injected. As described, in other embodiments, modulated carrier 221 can be at other frequencies above the operating frequency range of read and control signals. Consider the example illustrated by FIG. 6 where the carrier frequency is at 4 GHz. It is appreciated that the carry frequency used may vary between different types/models of hard disk drives depending upon the frequency band of read data and control signals in a particular type/model of hard disk drive. A second spike at 1.00018 GHz represents modulation induced due to natural vibrations of the slider (e.g., vibrations at 180 kHz). A third spike at 1.0002 GHz represents modulation which has been electrostatically induced by the injection of an modulating signal 271 at 100 kHz or 200 kHz. In an embodiment where procedure 515 is omitted, the third modulating spike at 1.0002 GHz will not be present. It is appreciated that FIG. 7 is a representation of modulated carrier 221 and its upper side band, and that similar signals would be seen in a representation of the lower side band of modulated carrier 221.

Figure 8:
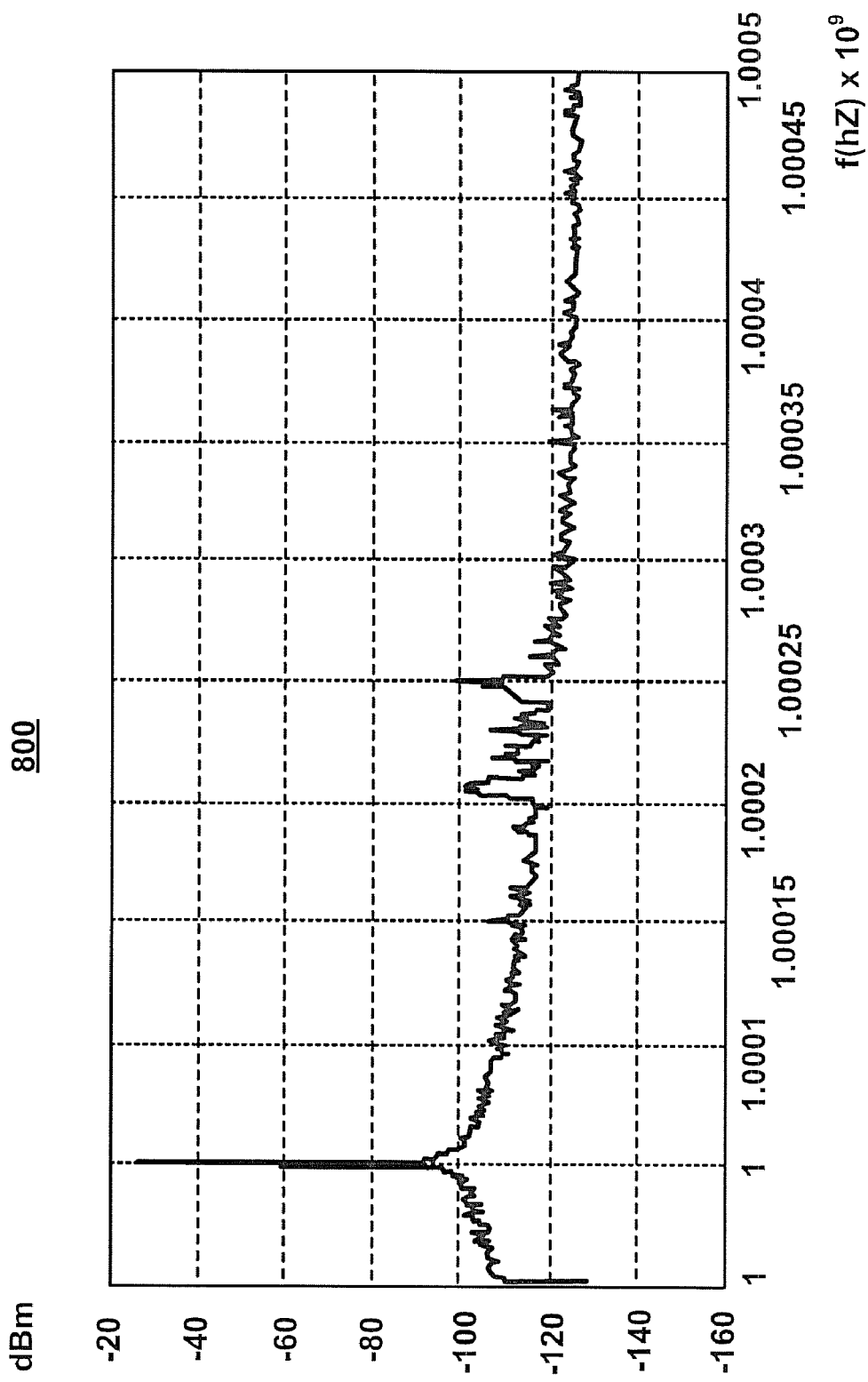
FIG. 8 shows an example of spectrum modulation of signals on writer lines at head-disk contact, according to one embodiment.

FIG. 8 shows an example 800 of spectrum modulation of signals on writer lines at head-disk contact, according to one embodiment. Example 800 illustrates the modulated carrier 221, of FIG. 7, represented by carrier spike at 1 GHz. In a comparison to FIG. 7 it is noted that the modulating spike at 1.00018 GHz has disappeared, as has the modulating spike at 1.0002 GHz. However an increase in frequency response and energy activity is noted in a range between 1.0002 GHz and 1.0025 GHz as compared to FIG. 7. This increase in energy is a result of modulation due to random slider vibrations in the range of 200-250 kHz. These random vibrations were caused by an occurrence of head-disk contact between the slider and the surface of a disk. It is appreciated that FIG. 8 is a representation of modulated carrier 221 and its upper side band, and that similar signals would be seen in a representation of the lower side band of modulated carrier 221.

At 530 of flow diagram 500, in one embodiment, the method demodulates the modulated version of the RF carrier signal to achieve a demodulated signal. In one embodiment, this comprises receiver demodulator 230 demodulating all or some range of a received modulated carrier 221. In one embodiment, demodulated signal 231 comprises a range of approximately +300 kHz and/or −300 kHz from an RF carrier frequency which is achieved/produced by this demodulation.

In one embodiment, spectrum analysis module 240 produces a signal spectrum of all or a portion of the frequencies of the demodulated signal. For example, in one embodiment, spectrum analysis module 240 produces this signal spectrum by performing a Fast Fourier Transform (FFT) on all or some portion of the demodulated signal 231. The signal spectrum shows the amplitude(s) and frequency/frequencies of the one or more signals which are represented in the signal spectrum. This signal spectrum is provided to signal analysis module 250. FIGS. 7 and 8 are visual examples of information included in a signal spectrum, in one embodiment.

At 540 of flow diagram 500, in one embodiment, the method analyzes the signal spectrum of a range of frequencies in the demodulated signal for activity indicative of a contact between a head of the slider and the surface of the disk. For example, this can comprise monitoring for a diminished amplitude or absence of a particular frequency within the range of frequencies included in the signal spectrum. This can additionally or alternatively comprise monitoring for an increase in frequency richness and energy which is associated with a head-disk contact. With reference to FIG. 8, the diminishment/absence of the spikes at 1.0002 GHz and/or 1.00018 GHz (as compared to FIG. 7) is something that is indicative of head-disk contact and which can be monitored for occurrence. Likewise, with reference to FIG. 8, the increased richness and energy of the frequencies in the 1.0002 GHz-1.00025 GHz range is indicative of head-disk contact and can be monitored for occurrence.

At 550 of flow diagram 500, in one embodiment the method detects an occurrence of the head-disk contact based upon an occurrence of the activity for which signal analysis module 250 monitors. Thus, when a monitored for diminishment/absence of a frequency occurs and/or when a monitored for increased in frequency richness and energy occurs, contact detector 255 detects an occurrence of head-disk contact between a slider, such as slider 125 and a disk surface, such as surface 130.

As shown in the plots of FIG. 7 and FIG. 8, the RF signal power is relatively low, additionally, in some embodiments, the modulated signal being tracked is very close to the carrier frequency. The power of the modulated signal(s) is on the order of −80 to −120 dBm, which is in the range of the signal strength of a typical cellular phone signal. In one example, contact detector 255 has a bandwidth such as 1 kHz, and is used to detect, for example, the 200 kHz modulating signal. This allows changes in the modulating signal (and therefore head-disk contact) to be detected very quickly. The detection speed is an inverse of the bandwidth frequency of contact detector 255, or $^1/_{1000}$ of a second (1 mS) in this example. In a current hard drive operating at a speed of, for example, 5400 revolutions per minute, such a system will detect an occurrence of contact in less than 1/10 of a disk revolution. This is much faster than present systems which may only work during data readback, and which typically take a time span equivalent to one or more disk revolutions to detect the occurrence of head-disk contact. Furthermore, by increasing bandwidth of contact detector 255 beyond 1 kHz, contact can be detected even more quickly than 1/1000 of a second.

In one embodiment contact detector 255 sends a signal to control module 260 to indicate detection of head-disk contact. In response, control module 260 takes an action to cause the contact to cease. Such action can include causing voltage biaser 290 to decrease voltage 291 and/or causing TFC 280 to decrease TFC voltage 281. Such action can also include ceasing a reading or writing operation, or repeating a reading or writing operation as a data error may have occurred due to the contact. This is useful during write operations since writing is typically a "blind" operation, i.e. there is no verification of written data following a write in HDDs. During writing in current commercial drives, a contact with the disk, due to asperities or a temporary accumulation of lube in a spot in the disk, may produce write errors that could be easily fixed by re-writing but would only be noticed possibly irrecoverably, during the next read operation. Removing the blindness to contact during writing allows for noting and fixing write errors during writing.

It is appreciated that system 200 and the method of flow diagram 500 can be implemented for a plurality of sliders and disks in a hard disk drive, such as HDD 100, which includes numerous sliders and numerous disks.

Example Work Function Difference Determination System

Figure 9:
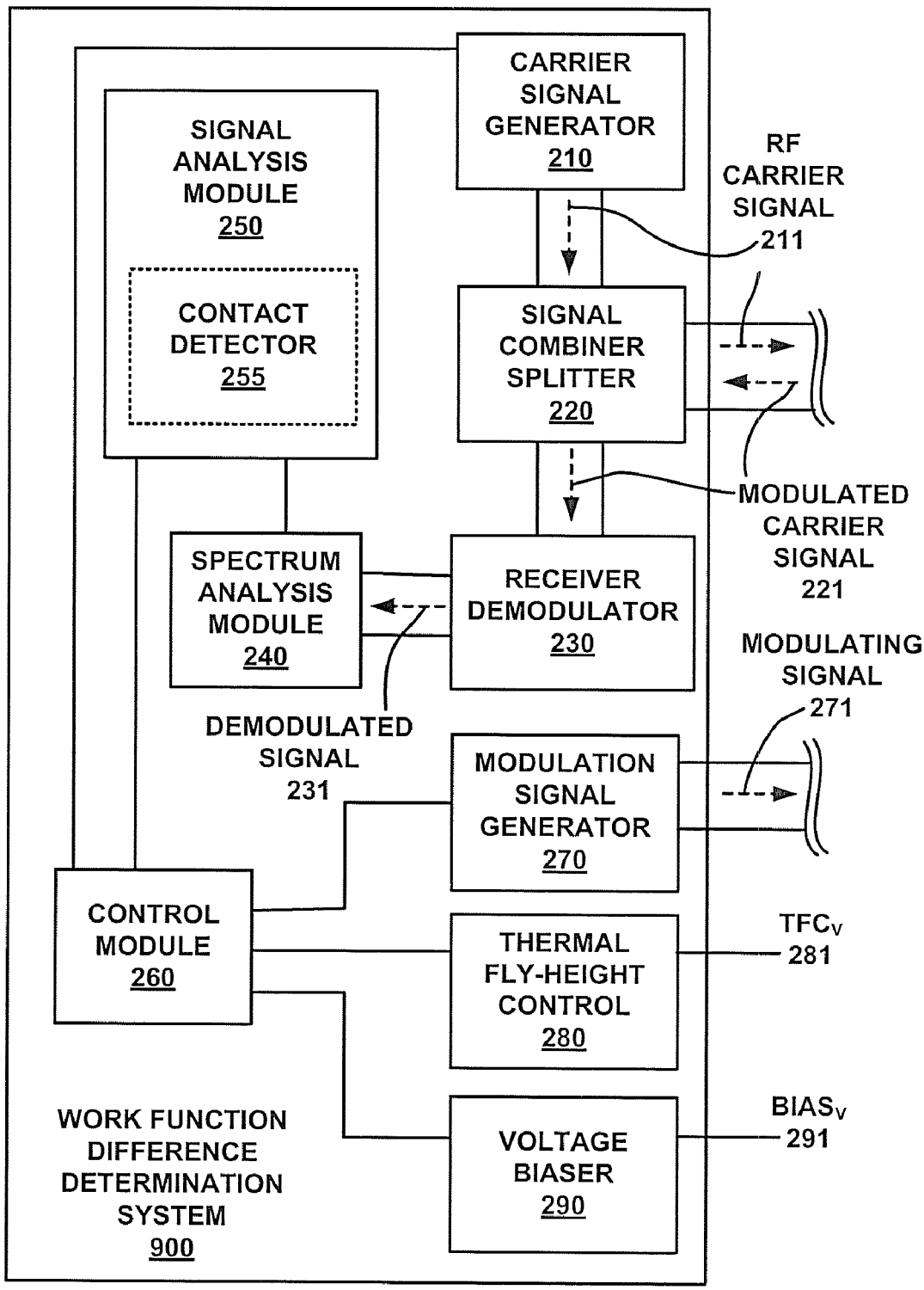
FIG. 9 is an example work function difference determination system, in accordance with one embodiment.

FIG. 9 is an example work function difference determination system 900, in accordance with one embodiment. Work function difference determination system 900 uses radio frequency (RF) signals injected into a slider, such as slider 125 (FIG. 1), to assist in determining a difference in world functions between a slider, such as slider 125, and a disk, such as disk 156 (FIG. 1). Work function difference determination is a procedure that can be performed at a variety of times over the lifespan of an HDD. In various embodiments, system 900 is implemented as a portion of AE module 115 and/or front end electronics of an HDD, such as HDD 100. This can comprise implementation within an integrated circuit, such as, for example, an Application Specific Integrated Circuit. In some embodiments, system 900 is included in a hard disk drive such as HDD 100.

In one embodiment, work function difference determination is performed during initial calibration of a hard disk drive, such as HDD 100. In one embodiment, work function difference determination is accomplished over a disk surface 130 (FIG. 1) and correlated with pre-defined specifications to determine the quality of magnetic material across surface 130. In one embodiment, work function difference determination is accomplished at frequent intervals during the operational lifetime of a hard disk drive, and then compared to a baseline/initial work function determination to determine occurrences of lube pickup by recognizing changes in the determined work function difference as compared to a baseline determination.

As depicted in FIG. 9, in one embodiment, work function difference determination system 900 comprises a carrier signal generator 210, a signal combiner splitter 220, a receiver demodulator 230, a spectrum analysis module 240, a signal analysis module 250, a control module 260, a modulation signal generator 270, a TFC 280, and voltage biaser 290.

It is appreciated that, with the exception of contact detector 255, the components and modules of system 900 are the same as those of head-disk contact detection system 200 of FIG. 2, which has been previously described. However, in one embodiment, when system 900 is additionally utilized for head-disk contact detection, contact detector 255 is included. Though the components and modules included in system 900 are substantially the same as those of system 200 (FIG. 2), they are controlled in a different fashion by control module 260. As will be described below, the components of system 900 are operated such that a difference in work functions between a slider, such as slider 125, and a disk, such as disk 156, can be determined. In the interest of brevity and clarity, reference is made to the previous description of the common components of system 200 and the description below concentrates on the differences, additional functions, and changes in operation as applicable to the components/modules of system 900.

Carrier signal generator 210 operates in the fashion previously described to generate RF carrier signal 211 for injection into a slider, such as slider 125. As previously described, the frequency of the carrier signal which is generated by carrier signal generator 210 is, in one embodiment, out-of-band above a frequency band of read data and control signals of the HDD in which system 900 is operated or is intended to be operated. In one embodiment, the frequency of RF carrier signal 211 is also out-of-band above the frequency of write data signals in the HDD in which system 900 is operated or intended to be operated. Reference is made to previous descriptions of out-of-band carrier signals and to FIG. 6 and its corresponding description to describe the concept of a frequency which is out-of-band above the operating frequency of read data and/or control signals in a HDD. Consider an embodiment where the top end of the range of data and/or control signals is approximately 3.5 GHz. In one such embodiment, carrier signal generator 210 generates RF carrier signal 211 at approximately 4 GHz.

Signal combiner splitter 220 receives RF carrier signal 211 and injects it into a slider, such as slider 125. As previously described, this can comprise injecting RF carrier signal 211 in common mode or differential mode. In one embodiment, signal combiner splitter 220 injects RF carrier signal 211 over existing lines such as read and/or write lines that already exist in a typical slider 125. In one embodiment, signal combiner splitter 220 injects RF carrier signal 211 via special purpose signal lines implemented in slider 125 for the injection of all or part of RF carrier signal 211. In one embodiment, signal combiner splitter 220 additionally receives modulated carrier 221 from slider 125 via existing lines or special purpose signal lines, and routes modulated carrier 221 to receiver demodulator 230.

Receiver demodulator 230 receives modulated carrier 221 and demodulates the modulated signal(s), within a particular frequency band, which are modulated onto modulated carrier 221, to achieve/produce demodulated signal 231. Consider an embodiment where modulated carrier 221 is modulated with frequencies of interest which are located in a frequency range which is 200 kHz above and/or below RF carrier signal 211. In one such embodiment, demodulated signal 231 comprises demodulation of signals in all or some portion of the range of approximately 200 kHz below and 200 kHz above RF carrier signal 211. In one embodiment, for the purpose of work function difference determination, modulated carrier 221 is modulated at a 200 kHz frequency of interest by electrostatic vibrations induced by modulating signal 271. This modulated frequency is equivalent to a "tone" of 200 kHz on the modulated carrier 221. It is appreciated that other frequencies of modulation are utilized in other embodiments.

Spectrum analysis module 240 produces a signal spectrum of all or some portion of the range of frequencies in the demodulated signal. In one embodiment, spectrum analysis module 240 utilizes a Fast Fourier transform (FFT) to accomplish the spectrum analysis and production of the signal spectrum in the form of a power spectrum of a plurality of frequencies. In other embodiments, other time domain or frequency domain techniques signal analysis techniques, such as band pass filtering, can be used to develop the signal spectrum. In one embodiment, spectrum analysis module 240 produces a signal spectrum of a tone induced by the modulating signal. In one embodiment, this tone is at or near 200 kHz. In one embodiment, this tone exists as upper and lower side bands modulated onto injected RF carrier signal 211.

Signal analysis module 250 analyzes the signal spectrum of the range of frequencies in the demodulated signal for activity indicative of a contact between a head of the slider and a surface of a disk of the hard disk drive. This can comprise monitoring the signal spectrum for a diminished amplitude or elimination of a particular frequency, such as the 200 kHz tone. The diminishment/elimination is indicative of a neutralization of work functions between a slider and a disk surface. Signal analysis module 250 communicates with control module 260 to control the application of a DC voltage to a slider, such as slider 125, and to vary the applied DC voltage until a voltage is determined at which an amplitude of the tone is eliminated or most minimized. In one embodiment, this variation is a variation by steps. Variation in other formats, such as ramping up a DC voltage up and down, may be utilized. Signal analysis module 250 determines the difference in work functions between a body of the slider (e.g., body 310 of FIG. 3) and a disk (e.g., disk 156) to be substantially equivalent to an applied DC voltage at which the amplitude of the tone is eliminated or most minimized. It is appreciated that difference in work functions may vary slightly from this DC voltage, such as within the range of the distance between voltage steps applied to a slider, but not in any significant way for purposes of cancelling or offsetting the difference in work function.

Control module 260, in various embodiments, controls when and whether system 900 is used for work function difference determination, including: control over the generation of RF carrier signal 211 by carrier signal generator 210; control over when and whether a modulating signal is generated by modulation signal generator 270; control of the frequency of modulating signal 271 (e.g., 100 kHz, 200 kHz, 400 kHz, some other frequency, or no frequency); control over whether and what TFC voltage 281 is generated and applied to a TFC heater coil; and control over whether and what voltage 291 is generated and applied to a slider body by voltage biaser 290.

Modulation signal generator 270 generates a modulating signal 271 which is out-of-band below the frequency band of read data, write data, and/or control signals in a hard disk drive. FIG. 6 and the accompanying discussion of FIG. 6 describe an example of signal which is out of band below the frequency band of read data and/or control signals. Due to being out-of-band, this modulating signal does not interfere with read/write/control operations of a slider when it is induced into the body of a slider, such as slider 125. Modulation signal generator 270, in one embodiment, operates under the control of control module 260 to generate modulating signal 271 for injection into slider 125. Modulating signal 271 causes an electrostatic modulation of slider 125 at a fundamental frequency (such as approximately the pitch 2 mode vibration frequency) of slider 125. This modulation of slider 125 causes a modulation to the fly height of slider 125 above a disk, altering capacitances between slider 125 and the disk and resulting in an injected RF carrier signal 211 being modulated into a modulated carrier 221.

In one embodiment, a modulating signal 271 of approximately 100 kHz causes an electrostatic modulation of slider 125 at harmonic approximately 200 kHz. This 200 kHz is a harmonic of the 100 kHz modulating frequency and is at or near a fundamental frequency associated with slider 125. In one embodiment, a different modulating signal 271 can be generated. For example, a modulating signal 271 of approximately 200 kHz also causes an electrostatic modulation of slider 125 at approximately 200 kHz (assuming difference in contact potential has not been neutralized). The modulation of the slider at a particular frequency produces a response at produces response at the second harmonic of that frequency and, if the difference in contact potential is not neutralized, additionally produces a response at the first harmonic or frequency of modulation. It is appreciated that electrostatic modulation at other frequencies besides 200 kHz can be effected in other embodiments.

TFC 280 operates under the control of control module 260 to generate TFC voltage 281 for application to a heater coil of slider 125. In general, by increasing and decreasing TFC voltage 281, a portion slider 125 is caused to expand and contract (back to a pre-excitation size) thus stepping slider 125 closer to or further away from surface 130. By stepping slider 125 closer to disk surface 130, the amplitude of a modulated carrier 221 is increased. This is because the distance between the thermally protruded head (by action of TFC) to disk surface is decreased, augmenting the capacitance from the head protrusion to the disk surface. In one embodiment of work function difference determination, such stepping is used to move slider 125 closer to disk surface 130 to more effectively sense whether and to what extent the modulated tone (e.g., 200 kHz) has been diminished or eliminated by the application of a DC voltage.

Voltage biaser 290 operates under the control of control module 260 to generate one or more DC voltages for application to slider 125. In one embodiment, control module 260 controls voltage biaser 290 to effect the generation of a varying DC bias voltage in the form of voltage 291 which is applied to a slider to assist in work function difference determination. By a varying DC voltage what is meant is that a fixed DC voltage is applied and is varied up and/or down to other fixed DC voltages 291, such as, for example, in steps or in a ramping fashion. The work function difference between a slider and a disk is determined, in one embodiment, to be the applied DC voltage 291 at which a particular modulated tone (e.g. 200 kHz) is most minimized or is eliminated. The tone becomes more and more diminished and even eventually eliminated as a DC voltage applied to slider 125 neutralizes the difference in work functions between slider 125 and disk 156 and causes the slider not to respond to the fundamental frequency of an AC voltage signal (e.g., modulating signal 271) applied to slider 125.

In one embodiment, after a DC bias voltage is determined which neutralizes a difference in work functions between a slider and a disk, control module 260 directs voltage biaser 290 to apply such a DC voltage (e.g., to the body of the slider or to the disk) as an offset. Such application neutralizes effects of work function difference, such as undesired/uncontrolled electrostatic attractive forces between the slider and the disk. Similarly such neutralization repels or actively prevents attraction of lube particles which would normally be attracted from the disk surface to the slider during operation due to the existence of a difference in work functions. Preventing electrostatic attraction of lube particles to the slider assists in maintaining consistent flying characteristics of the slider.

In some embodiments, after neutralization of the difference in work functions, additional voltage 291 can be applied to create an electrostatic attraction between slider 125 and disk surface 130. This additional voltage 291 can be used for active fly-height control and/or active damping of slider vibrations.

Figure 10:
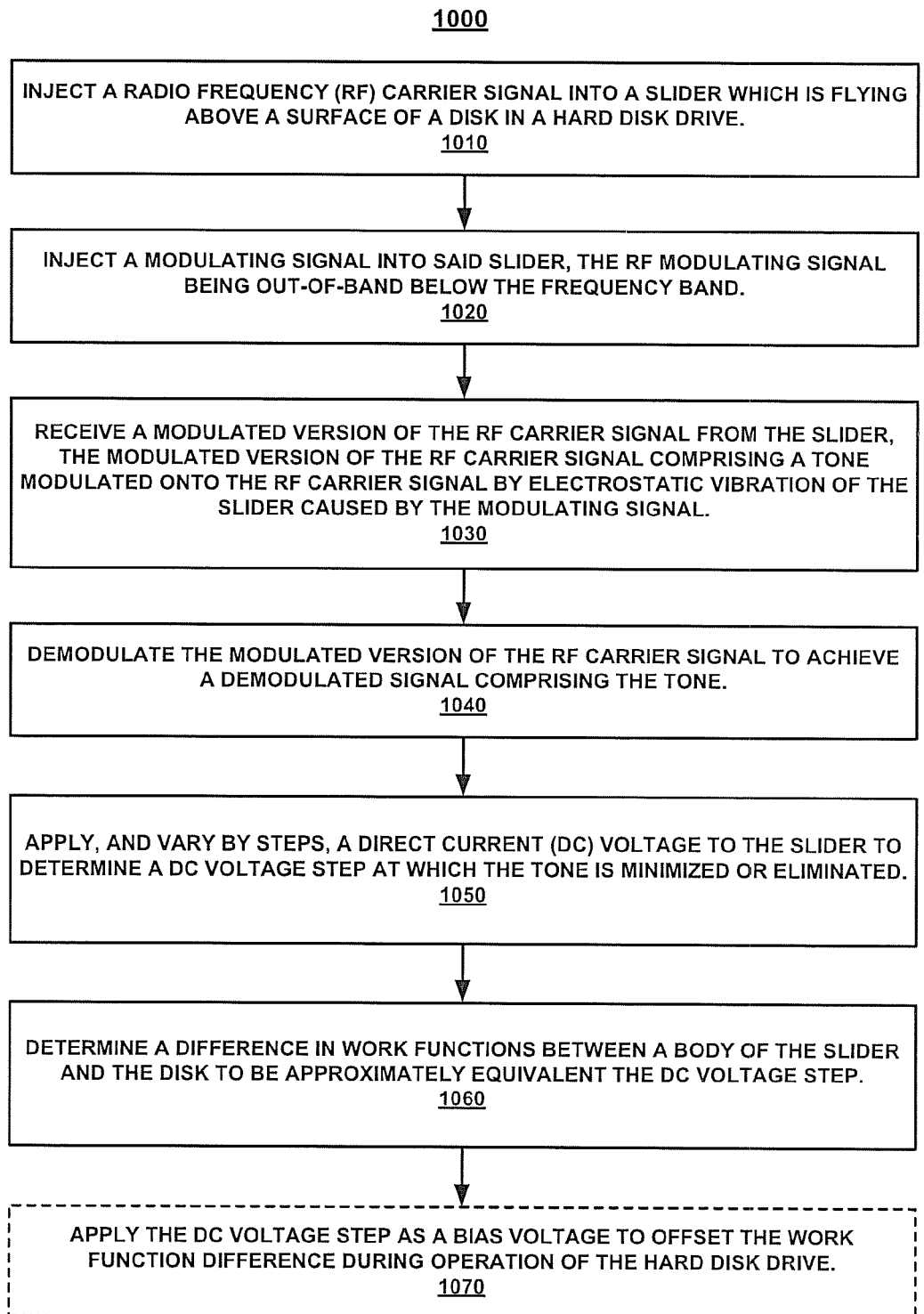
FIG. 10 shows a flow diagram of an example method of determining a difference in work functions between a slider body and a disk, according to one embodiment.

Example Method of Determining a Difference in Work Functions Between a Slider Body and a Disk FIG. 10 shows a flow diagram of an example method of determining a difference in work functions between a slider body and a disk, according to one embodiment. In one embodiment, this method is implemented in a hard disk drive, such as HDD 100. Reference will be made to FIGS. 1, 3, 4, and the diagrams of FIGS. 6, 11, and 12 in the description of the method of flow diagram 1000.

At 1010 of flow diagram 1000, in one embodiment, the method injects an out-of-band Radio Frequency (RF) carrier signal into a slider which is flying above a surface of a disk in a hard disk drive. The RF carrier signal is out-of-band above a frequency band of read data, write data, and/or control signals in the hard disk drive in which the RF carrier signal is injected. For example, in one embodiment, carrier signal generator 210 generates RF carrier signs 211, which signal combiner splitter 220 injects into slider 125. As described in conjunction with FIG. 3 and FIG. 4, this can comprise differential mode injection or common mode injection. In either common mode or differential mode injection, RF carrier signal 211 can be injected onto signal lines which are coupled to read and/or write heads of a slider, such as slider 125. In some embodiments, RF carrier signal 211 can additionally or alternatively be injected on other signal lines which are coupled to the head of a slider such as slider 125.

FIG. 6 shows an example of spectrum allocation for out-of-band signals used according to one embodiment. Following the example illustrated by FIG. 6, in one embodiment, RF carrier signal 211 is at a frequency such as 4 GHz, which is well above the top end of signal range 610.

At 1020 of flow diagram 1000, in one embodiment, the method injects an out-of-band modulating signal into the slider. The injected modulating signal is out-of-band below the frequency band of read data, write data, and/or control signals in the hard disk drive in which the method is being employed. In one embodiment, this comprises modulation signal generator 270 generating and then injecting modulating signal 271 into slider 125. In one embodiment modulating signal 271 is injected via a coupling to slider body 310, as illustrated in FIG. 3. In some embodiments, modulating signal 271 can also be injected in a common mode or differential mode fashion similar to the illustrations and description of the injection of RF carrier signal 211 which are shown and described in conjunction with FIG. 3 and FIG. 4.

Referring again to the example illustrated by FIG. 6, in one embodiment, modulating signal 271 is at a frequency such as 100 kHz or 200 kHz, which is well below the bottom end of signal range 610. Modulating signal 271 causes electrostatic vibrations within a slider, such as slider 125, thus modulating the fly height of the slider and resulting in a modulation of injected RF carrier signal 211 into modulated carrier 221.

At 1030 of flow diagram 1000, in one embodiment, the method receives a modulated version of the RF carrier signal from the slider. The modulated version of the RF carrier signal comprises a tone modulated onto the RF carrier signal by electrostatic vibration of the slider which are caused by the modulating signal. For example, in one embodiment, this comprises system 900 receiving modulated carrier 221 from a slider, such as slider 125. This can comprise signal combiner splitter 220 or some other portion of system 900 receiving modulated carrier 221, which comprises a modulated version of injected RF carrier signal 211 that has been electrostatically modulated by injected modulating signal 271.

Figure 11:
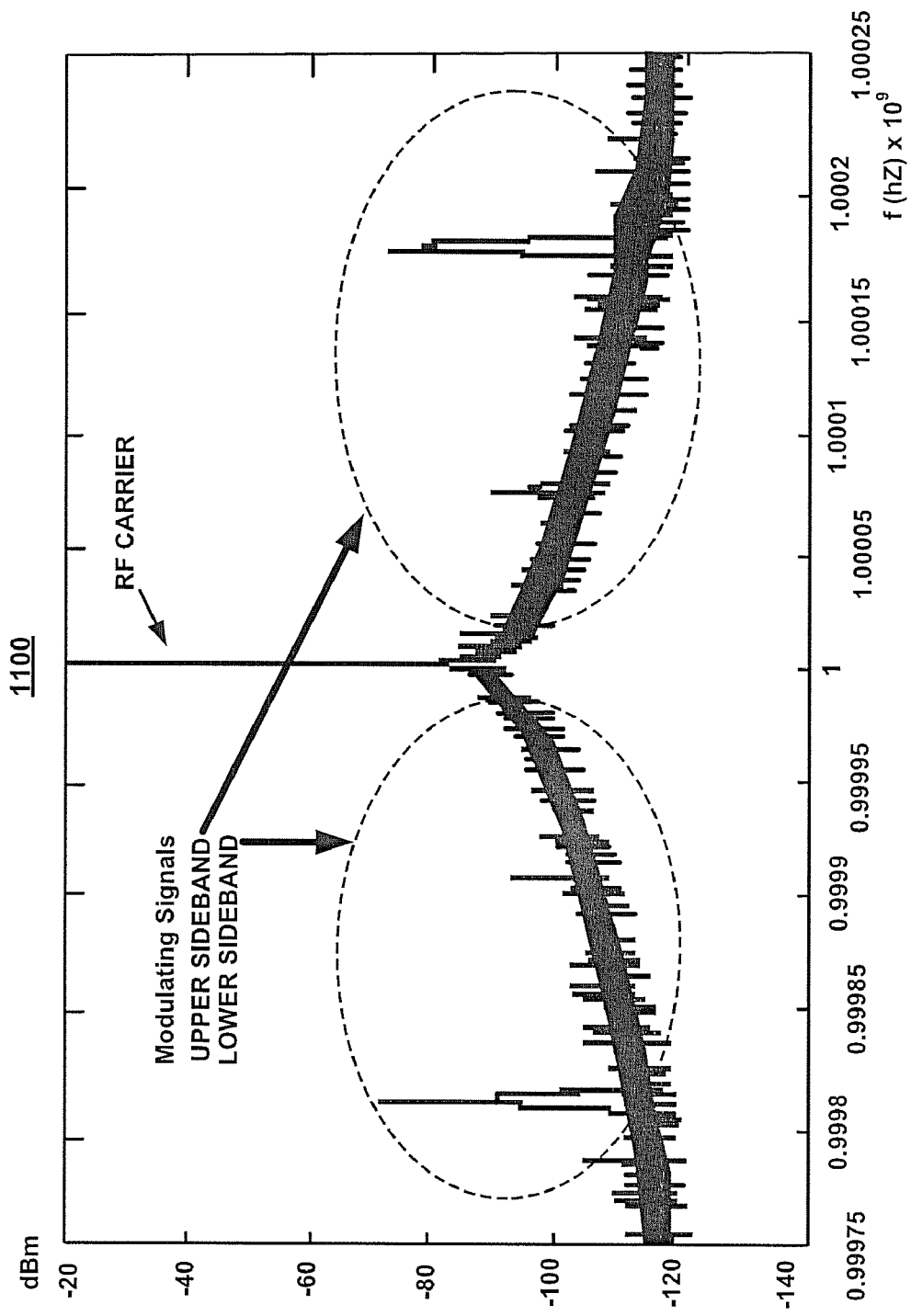
FIG. 11 shows an example spectrum of a Radio Frequency (RF) carrier and modulating signals with upper side bands and lower side bands, according to one embodiment.

FIG. 11 shows an example 1100 of a spectrum of a Radio Frequency (RF) carrier and modulating signals with upper side bands and lower side bands, according to one embodiment. Example 1100 shows a modulated carrier 221 represented by a spike at 1 GHz with modulation on sidebands. The 1 GHz RF carrier (e.g., the carrier portion of modulated carrier 221) is well above the operating frequency range of read data and control signals in the particular hard drive in which the carrier signal was injected. As described, in other embodiments, the modulated carrier 221 can be at other frequencies above the operating frequency range of read and control signals. Consider the example illustrated by FIG. 6 where the carrier frequency is at 4 GHz. In example 1100, spikes at 0.9998 GHz and 1.0002 GHz represent electrostatically modulated lower and upper sidebands induced by the injection of modulating signal 271 at 200 kHz. In example 1100, spikes at 0.9999 GHz and 1.0001 GHz represent harmonics of electrostatically modulated lower and upper sidebands induced by the injection of a modulating signal 271 at 200 kHz.

At 1040 of flow diagram 1000, in one embodiment, the method demodulates the modulated version of the RF carrier signal to achieve a demodulated signal comprising the tone. In one embodiment, this comprises receiver demodulator 230 demodulating all or some range of a received modulated carrier 221. Consider an example, where a 200 kHz tone is modulated onto an RF carrier signal. In one such example, demodulated signal 231 comprises a range of approximately +200 kHz and/or −200 kHz from an RF carrier frequency which is achieved/produced by this demodulation. This range includes the 200 kHz tone. In one embodiment, only one sideband is demodulated into a demodulated signal. In one embodiment, only a portion of one side band or of each side band which encompasses the modulated tone is demodulated into a demodulated signal.

In one embodiment, spectrum analysis module 240 produces a signal spectrum of all or a portion of the frequencies of the demodulated signal. For example, in one embodiment, spectrum analysis module 240 produces this signal spectrum by performing a Fast Fourier Transform (FFT) on all or some portion of the demodulated signal 231. The signal spectrum shows the amplitude(s) and frequency/frequencies of the one or more signals which are represented demodulated signal. This signal spectrum is provided to signal analysis module 250. FIG. 11 is a visual example of information included in a signal spectrum, in one embodiment.

At 1050 of flow diagram 1000, in one embodiment, method applies a direct current (DC) voltage to the slider and varies the voltage in steps to determine a DC voltage step at which the tone is minimized or eliminated. In one embodiment, this comprises voltage biaser 290 applying a DC bias voltage to the body of slider 125. In one embodiment, as illustrated in FIG. 3, DC bias voltage in the form of voltage 291 is applied to a slider. The applied DC bias voltage is varied by steps under control of control module 260 (with feedback from signal analysis module 250) to determine a particular DC voltage which causes slider 125 to be least responsive or unresponsive to modulating signal 271.

At 1060 of flow diagram 1000, in one embodiment, the method determines a difference in work functions between a body of the slider and the disk to be substantially equivalent the DC voltage of the DC voltage step which causes the slider to be least responsive or unresponsive to modulating signal 271. For example, in one embodiment, signal analysis module 250 monitors the signal spectrum associated with the tone (e.g., the demodulated 200-Hz tone) to determine the particular applied DC bias voltage at which the tone is minimized or eliminated. This particular DC bias voltage is then determined to be the difference in work functions between a body (e.g., body 310) of slider 125 and disk 156. Depending on how finely grained the steps of variance are, this DC voltage may not be the exact voltage of the work function difference, but it will be substantially equal to it, being off, at most, by some amount within the range of the voltage steps being applied.

In one embodiment, control module 260 also controls application of TFC voltage 281, via TFC 280. For example an increase in TFC voltage causes a thermally induced protrusion on slider 125, which in turn causes slider 125 to fly closer to disk 156. This improves the ability to detect modulated carrier 221 and thereby improves detection of the modulated tone. Thus, when the tone appears to be minimized at one flying-height by application of a DC voltage, control module 260 steps up TFC voltage 281 to improve detection of the tone and further examine how well the tone has been minimized or eliminated by the application of DC bias voltage in the form of voltage 291. In one embodiment, the stepping of TFC voltage 281 and the varying of voltage 291 are controlled to reduce and/or eliminate (in some embodiments) the measured amplitude of the tone, based upon feedback received from signal analysis module 250.

FIG. 12 shows an example 1200 of upper side band and lower side band detected power for a modulating signal as a function of Direct Current (DC) bias on a slider body, according to one embodiment. Example 1200 shows that, in one embodiment, application of a DC bias voltage (in the form of voltage 291) of −0.25 volts DC most minimizes the amplitude of the 200 kHz tone. In one embodiment, control module 260 and signal analysis module 250 act together, as described above, to determine that −0.25 volts DC is the DC bias voltage which most minimizes the amplitude of the 200 kHZ tone. In such an embodiment, signal analysis module 250 and/or control module 260 determine the difference in work functions between slider 125 and disk 156 to be approximately and substantially −0.25 volts DC.

At 1070 of flow diagram 1000, in one embodiment, the method applies the DC voltage as a bias voltage to offset the work function difference during operation of the hard disk drive. For example, with reference to FIG. 12, in one embodiment, control module 260 directs voltage biaser 290 to apply a DC bias voltage of −0.25 volts to neutralize the difference in work functions between a body of slider 125 and disk 156 while slider 125 is flying over the surface of disk 156.

It is appreciated that system 900 and the method of flow diagram 1000 can be implemented for a plurality of sliders and disks in a hard disk drive, such as HDD 100, which includes numerous sliders and numerous disks.

It is also appreciated that system 900 can be operated in as "always on," or such that system 900 is only on a particular time such as only at boot time and/or only at scheduled moments during operation of a hard disk drive such as during maintenance and/or scheduled automatic checks. Those skilled in the art will appreciate that the functions of system 900 and of the method of flow diagram 1000 can be practiced as "always on" or "on" only at specific times or in specific circumstances without departing from the spirit of the embodiments of the invention as presented herein.

Example embodiments of the present invention are thus described. Although the embodiments of the present invention have been described in a language specific to structural features and/or methodological acts, it is to be understood that the embodiments of the present invention defined in the appended claims are not necessarily limited to the specific features or acts described above. Rather, the specific features and acts described above are disclosed as example forms of implementing the claims.

What is claimed is:

1. A method of head-disk contact detection in a hard disk drive, said method comprising:
   injecting a Radio Frequency (RF) carrier signal into a slider which is flying above a surface of a disk in a hard disk drive;
   injecting a modulating signal into said slider for modulating said RF carrier signal;
   receiving a modulated version of said RF carrier signal from said slider;
   demodulating said modulated version of said RF carrier signal to achieve a demodulated signal;
   analyzing a signal spectrum of a range of frequencies in said demodulated signal for activity indicative of a contact between a head of said slider and said surface of said disk; and
   detecting an occurrence of said contact based upon an occurrence of said activity.

2. The method as recited in claim 1, wherein said receiving a modulated version of said RF carrier signal from said slider comprises:
   receiving said modulated version of said RF carrier signal which has been modulated by said modulating signal.

3. The method as recited in claim 1, wherein said analyzing a signal spectrum of a range of frequencies in said demodulated signal for activity indicative of a contact between a head of said slider and said surface of said disk comprises:
   monitoring said signal spectrum for an augmented or diminished amplitude of a particular frequency within said range of frequencies, said particular frequency being associated with said modulating signal; and
   monitoring said signal spectrum for an increase in frequency richness demonstrated as an appearance of broadband signal activity and energy associated with said contact.

4. The method as recited in claim 1, wherein said receiving a modulated version of said RF carrier signal from said slider comprises:
   receiving said modulated version of said RF carrier signal which has been modulated due to said contact between said slider and said surface of said disk.

5. The method as recited in claim 1, wherein said analyzing a signal spectrum of a range of frequencies in said demodulated signal for activity indicative of a contact between said a head of said slider and said surface of said disk comprises:
   monitoring said range of frequencies for an increase in frequency richness demonstrated as an appearance of broadband signal activity and energy associated with said contact.

6. A radio frequency (RF) head-disk contact detection system, said system comprising:

a carrier signal generator configured for generating an RF carrier signal which is out-of-band above a frequency band of read data and control signals in said hard disk drive;

a modulation signal generator for generating a modulating signal which is out-of-band below said frequency band for modulating said RF carrier signal;

a signal combiner splitter configured for injecting said RF carrier signal into a slider said hard disk drive and routing a modulated version of said RF carrier signal received from said slider;

a receiver demodulator configured for demodulating said modulated version of said RF carrier signal to achieve a demodulated signal;

a signal analysis module configured for analyzing a signal spectrum of a range of frequencies in said demodulated signal for activity indicative of a contact between said a head of said slider and a surface of a disk of said hard disk drive; and a contact detector configured for detecting an occurrence of said contact based upon an occurrence of said activity.

7. The system of claim 6, wherein said signal combiner splitter is configured for injecting said RF carrier signal in common mode into said slider.

8. The system of claim 6, wherein said signal combiner splitter is configured for injecting said RF carrier signal in differential mode into said slider.

9. A hard disk drive comprising:

a disk comprising a surface for magnetic storage of data;

a slider having a head, said slider configured for moving across said surface for writing and reading of said data; and a radio frequency (RF) head-disk contact detection system coupled with said slider and configured for using an RF signal for detection of contact between said head and said disk during operation of said hard disk drive, wherein said RF head-disk contact detection system comprises:

a carrier signal generator configured for generating an RF carrier signal;

a modulation signal generator for generating a modulating signal for modulating said RF carrier signal;

a signal combiner splitter configured for injecting said RF carrier signal into said slider of said hard disk drive and routing a modulated version of said RF carrier signal received from said slider;

a receiver demodulator configured for demodulating said modulated version of said RF carrier signal to achieve a demodulated signal;

a signal analysis module configured for analyzing a signal spectrum of a range of frequencies in said demodulated signal for activity indicative of a contact between said a head of said slider and a surface of a disk of said hard disk drive; and a contact detector configured for detecting an occurrence of said contact based upon an occurrence of said activity.

* * * * *